Patented May 11, 1937

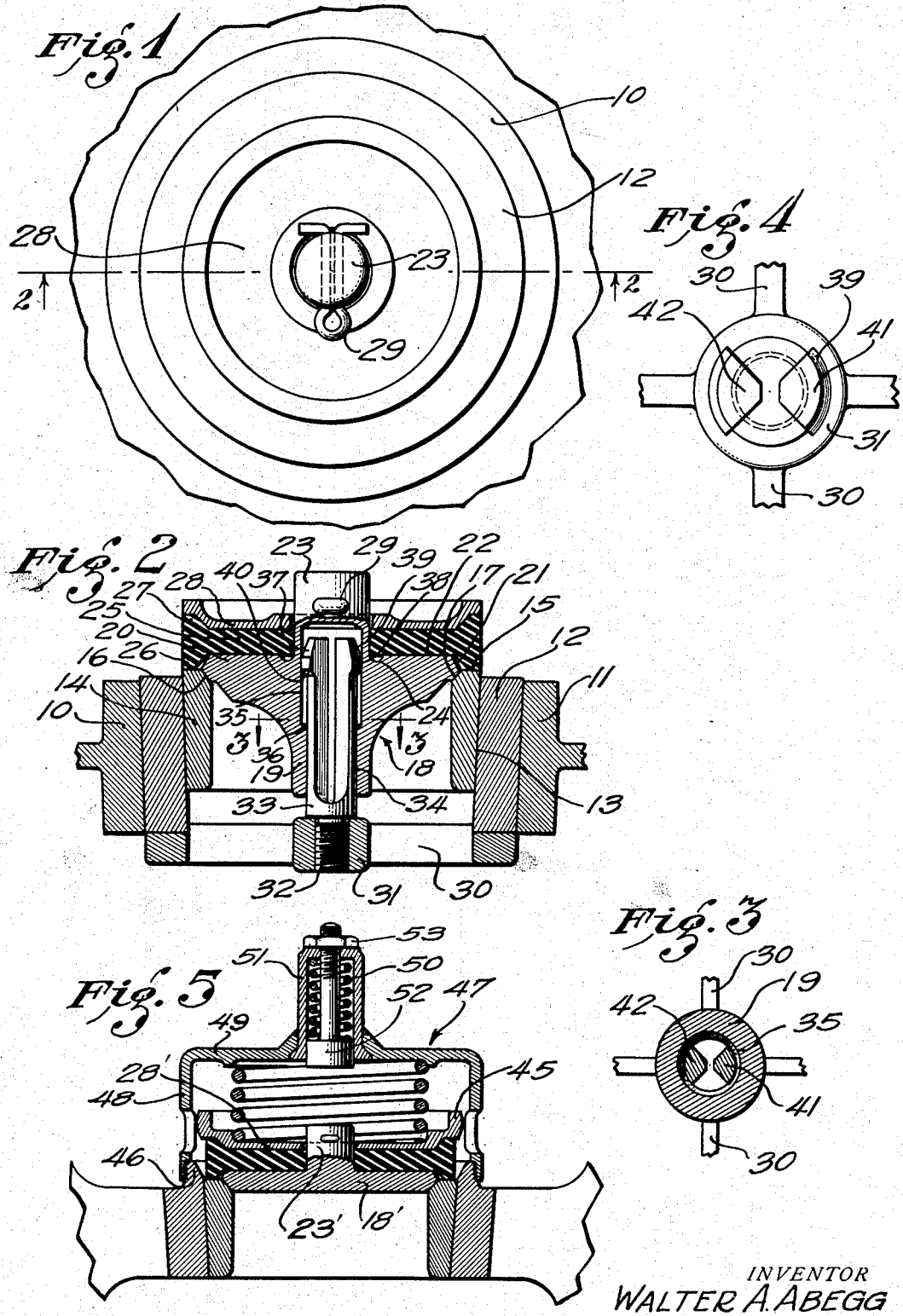

2,079,647

UNITED STATES PATENT OFFICE 2,079,647

VALVE FOR SLUSH PUMPS AND THE LIKE

Walter A. Abegg, Los Angeles, Calif., assignor of one-half to Baldwin Reinhold, Los Angeles, Calif.

Application December 31, 1934, Serial No. 759,968

3 Claims. (Cl. 251—127)

This invention relates to valve pumps and particularly pertains to valves for slush pumps and the like.

In the operation of slush pumps it is necessary to provide valve members which are subjected to the abrasive action of the slush which must be passed through them and which makes it necessary to provide a valve which will easily set upon its seat, allowing for the required stroke of the valve, and which valve may be readily withdrawn, replaced, or repaired. It is also desirable to provide a valve structure of the type specified, designed to be readily adapted for use in pumps having different sizes of valve openings so that the valve unit may be easily adapted for use in pumps which vary in design, capacity and dimension of parts. It is the principal object of the present invention, therefore, to provide a valve structure formed with a suitable seat packing and sealing means, and adapted to be readily mounted in its operative position and easily removed therefrom, and which is also provided with an adapter structure by which it may be applied to valve openings of different diameters, although the wearing parts of the valve structure will be the same for all sizes of pumps, thus reducing the amount of high grade stock required, and thereby reducing the cost of manufacture and replacement.

It is also an object of the present invention to provide a valve structure which will be capable of ready assembly and removal and which is provided with simple stroke limiting means.

The present invention contemplates the provision of an adapter sleeve which may seat within the fluid opening of a pump and which receives a removable valve seat upon which a valve tappet may be positioned, the tappet carrying fluid sealing means and being detachably mounted on a central valve guide in a manner to allow it to have a desired limited stroke without becoming bound or jammed due to the amount of fluid or solids which might accumulate within the valve structure.

The invention is illustrated by way of example in the accompanying drawing in which:

Figure 1 is a view in plan showing the complete valve assembly with which the present invention is concerned.

Fig. 2 is a view in central vertical section through a valve of the type with which the present invention is concerned and indicating a fragmentary portion of the pump cylinder, the view being taken on the line 2—2 of Fig. 1.

Fig. 3 is a view in transverse section through the valve structure as seen on the line 3—3 of Fig. 2 and indicating the valve guide.

Fig. 4 is an enlarged view showing the end of the valve guide stem.

Fig. 5 is a view in vertical section showing another form of the present invention with an overhead valve cage.

Referring more particularly to the drawing, 10 indicates the wall of a pump structure through which fluid may pass. An opening 11 is formed through this wall to receive an adapter sleeve 12. This sleeve is preferably formed of hardened steel and is of an outside diameter suitable to permit it to be pressed into place and to be held in its fixed position. In practice it is contemplated that the adapter sleeves may be made with the outside diameter greater than the maximum diameter of an opening in pumps in which it is to seat. The valves otherwise assembled and ready for installation are delivered to the job, after which the outside diameter of the adapter may be drawn to fit the particular pump into which it is to be installed. Thus the one valve unit can be used on different sizes and types of pump. The inside wall of the adapter is tapered as indicated at 13 to receive a tubular valve seat 14. This tubular seat has an outer circumferential face agreeing in taper with the face 13 of the adapter sleeve 12, thus making it possible for the tubular valve seat 14 to be readily forced into position in the upper tapered mouth of the adapter sleeve. It is desirable that the tubular valve seat 14 shall be of such dimensions as to cause an upper protruding portion to occur above the upper flat face of the adapter 12. The tubular seat 14 is provided with an outer flat face 15 which lies in a plane at right angles to the longitudinal axis of the valve structure and forms a sealing face 15 as will be hereinafter described. The inner edge of the mouth of the tubular valve seat 14 is bevelled downwardly and inwardly to form a seating face 16 which is circumscribed by the sealing face 15. The seating face receives a tapered face 17 of the tappet valve 18. The tappet valve body is disc-shaped and has a downwardly protruding boss portion 19 and an upwardly extending disc portion 20. The disc portion 20 lies above the plane of the sealing face 15 and is upwardly and inwardly tapered around its circumference as indicated at 21. The disc portion 20 has an upper flat face 22 from which a boss 23 extends. The boss is circular in cross section and its face is broken at the point where it intersects the face 22 of the top of the valve member 18, this break being made by an annular recess 24 cut into the face 22 and circumscribing the base of the boss 23. Fitted against the face 22 of the valve member 18 is a non-metallic sealing member 25 preferably formed of rubber. This sealing member is circular in shape and agrees substantially in diameter with the diameter of the upper edge of the tubular valve seat 14. The body of the sealing member 25 is formed along its circumferential edge with a downwardly extending annular rib portion 26 and an upwardly extending annular rib portion 27. The downwardly extending rib 26 overhangs the upwardly projecting portion 20 of the valve 18 and has a flat face which rests against the upwardly presented flat face 15 of the tubular valve seat 14 to form a fluid seal therewith. Attention is directed to the fact that an annular span of V shaped cross section occurs between the inclined face of the upper valve portion 20 and the inner face of the lower rib 26 of the sealing member. This prevents an accumulation of material at this point and also creates a desired fluid seal. The upwardly projecting rib 27 is covered by a top plate 28 which conforms in sectional configuration to the entire upper face of the non-metallic sealing member 25. The top plate 28 has a central opening through it to accommodate the upwardly projecting portion of the boss 23. A transverse cotter pin 29 is carried by the boss and holds the top plate 28 in position. It will be evident that the non-metallic sealing member 25 may be reversed when its rib 26 wears so that the rib 27 may be used for sealing purposes. The adapter sleeve 12 is provided with a transverse arm structure 30 diametrically across its bottom portion and carries a threaded boss 31. This boss receives the lower threaded end 32 of a guide stem 33 upon which the valve structure may reciprocate. The stem has a tubular body portion which extends upwardly through a bore 34 of the valve 18, the bore and the tubular portion of the stem having a close sliding fit with relation to each other. A cylindrical counterbore 35 is formed as a continuation of the upper end of the bore 34 within the valve, this counterbore being of a diameter greater than that of the diameter of the bore 34, thus providing a tapered shoulder 36. The upper and terminating end of the tubular guide stem is formed with an enlarged head portion 37. This head portion has a major diameter 38 agreeing substantially with that of the counterbore 35 and having a sliding fit therewith. The terminating end of the guide stem is slightly tapered as indicated at 39 and its base portion is formed with a tapered face 40 agreeing in angularity with the tapered face 36 at the bottom of the counterbore. The tubular wall of the stem 33 is split longitudinally to form clearance so that the head portion of the stem may be contracted as it is forced through the relatively small opening 34 until it passes the shoulder 36 after which it will expand into the larger counterbore 35 and may reciprocate within this expanded portion to provide limited movement of the valve as it is moved up and down toward and away from its seat during the normal operation of the structure.

In the operation of the present invention the guide stem is secured in position on the boss 31 of the transverse supporting arms 30 after which the assembled valve is forced on to the tapered end of the guide stem. This is due to the fact that the head formed on the end of the guide stem is of greater diameter than the bore 34 through which it initially passes. The two sides 41 and 42 of the stem will be forced toward each other as permitted by the slots which are formed in the stem. When the head member 37 has passed through the relatively small bore 34 it will expand as it passes the tapered face 36 and will assume a sliding position within the counterbore 35. It will be evident that under normal circumstances the valve will remain on the guide stem but will have limited reciprocable movement. This will automatically control the length of stroke of the valve. If it is desired to remove the valve from the stem, an excessive force may be applied so that the tapered back face 40 of the head 37 will engage the tapered face 36 of the bore to contract the head and permit it to be withdrawn from the bore. The adapter sleeve, as has been previously stated, is normally made with a larger outside diameter than that of the opening in any valve seat of the various types of pumps on which it may be used. This adapter may thus be readily turned down to a desired diameter and pressed into its seated position. It will also be evident that the tubular valve seat 14, due to its tapered engagement with the sleeve, may be pressed into its seated position and may thus be readily removed when new valve seats are to be used. As the valve mechanism operates there will be the usual reciprocating stroke of the valve on the guide stem bringing the tappet valve member 18 on to its seat with the faces 16 and 17 of the seat and the valve respectively into closing position and elevate the same therefrom. It will also be seen that the sealing member 25 will be free to seat upon the flat upper face of the valve seat 14 to provide an additional fluid seal. Attention is also directed to the fact that the slots which are formed lengthwise of the guide stem terminate at a point below the lower end of the valve hub so that any fluid which might pass into the bore of the valve stem could be readily pumped therefrom in an automatic action so that fluid would not accumulate within the valve and cause it to stick in an opened position.

Referring particularly to Fig. 5 of the drawing, it will be seen that the guide pin 33 has been eliminated and that the upper plate 28' has been provided with a circumscribing guide flange 45. The valve seat 14 is provided with an upwardly projecting threaded portion 46. This receives a valve cage 47 having a cylindrical side wall 48 and an upper end wall 49. The plate 28' with its flange 45 reciprocates within this cage as the valve is raised or lowered. The stroke of the valve is limited by the engagement of flange 45 with the end wall 49 of the cage. This force is damped by a spring 50 mounted within a thimble 51 carried upon the cage and within which a plunger 52 may reciprocate. The plunger 52 is adjustably set in its thimble 51 by a nut 53 which limits the downward movement of the plunger. When the valve 18' moves upwardly its extension 23' strikes the plunger 52 and lifts it against the expansion action of spring 50.

It will thus be seen that the valve here disclosed combines the desirable features of the metallic tappet valve and a non-metallic seal valve; that the valve may be readily adapted for use on different types of pumps; that its valve seat may be easily removed and interchanged; and that the valve itself may be quickly detached and installed with relation to the guide stem without the use of any separate fastening members.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. A slush pump valve comprising an adapter sleeve, said sleeve having an internal and external taper, and carrying a bridge mounted at its lower end, a valve seat mounted therein, a valve member for said seat, a split valve stem mounted upon the bridge to reciprocably support the valve member and means upon the split end of the valve stem for limiting the movement of the valve member with relation to the seat.

2. A slush pump valve comprising an adapter sleeve having an internal and external taper, a valve seat in said sleeve, a valve reciprocable relative thereto and having stroke limiting means therein, a bridge carried by the adapter sleeve and a stem secured by one end thereto, said stem being formed with a shoulder adjacent its free end, said valve member being reciprocable upon said stem, said stem bein split longitudinally of its free end to permit the shoulder to engage the limiting means within the valve member thereby controlling the stroke of said valve.

3. A valve structure comprising an adapter sleeve having a web structure mounted in its lower end, an annular valve seat mounted therein, a valve member of the tappet type, adapted to rest thereon, a valve stem rigidly secured to the web structure of the adapter sleeve and concentrically of the valve seat, a central bore within the valve member, a counterbore formed within the central bore to form a shoulder near the outer end of the central bore, an enlarged frusto-conical head formed at the free end of the valve stem, said valve stem and head being split longitudinally thereof, a shoulder at the bottom of the head to engage the shoulder formed within the valve member, the head being positioned on the valve stem a sufficient distance from its secured end to allow a limited stroke of the valve member.

WALTER A. ABEGG.